United States Patent [19]

Ohno

[11] Patent Number: 4,483,892
[45] Date of Patent: Nov. 20, 1984

[54] WEAR RESISTANT ANNULAR INSERT AND PROCESS FOR MAKING SAME

[75] Inventor: John M. Ohno, Plymouth, Mich.

[73] Assignee: General Electric Company, Detroit, Mich.

[21] Appl. No.: 331,369

[22] Filed: Dec. 16, 1981

[51] Int. Cl.³ ............................................. C04B 35/65
[52] U.S. Cl. ...................................... 428/36; 264/60; 264/113
[58] Field of Search .................... 51/307; 264/60, 113; 428/36

[56] References Cited

U.S. PATENT DOCUMENTS

| | | | |
|---|---|---|---|
| 2,938,807 | 5/1960 | Anderson | 106/44 |
| 3,816,081 | 6/1974 | Hale | 75/203 |
| 4,018,631 | 4/1977 | Hale | 148/31.5 |
| 4,063,909 | 12/1977 | Mitchell | 51/309 |
| 4,124,401 | 11/1978 | Lee et al. | 51/307 |
| 4,151,686 | 5/1979 | Lee et al. | 51/307 |
| 4,167,399 | 9/1979 | Lee et al. | 51/307 |
| 4,173,614 | 11/1979 | Lee et al. | 51/307 |
| 4,219,339 | 8/1980 | Wilson | 51/307 |
| 4,220,455 | 9/1980 | St. Pierre et al. | 51/295 |
| 4,220,677 | 9/1980 | Fedoseev et al. | 427/215 |
| 4,238,433 | 12/1980 | Hillig | 264/60 |
| 4,242,106 | 12/1980 | Morelock | 51/307 |
| 4,247,304 | 1/1981 | Morelock | 51/295 |
| 4,248,606 | 2/1981 | Bovenkerk | 51/307 |
| 4,268,582 | 5/1981 | Hale et al. | 428/466 |

FOREIGN PATENT DOCUMENTS

| | | |
|---|---|---|
| 12966 | 7/1980 | European Pat. Off. |
| 10257 | 9/1980 | European Pat. Off. |
| 2006733 | 5/1979 | United Kingdom |

Primary Examiner—James Derrington
Attorney, Agent, or Firm—Hedman, Gibson, Costigan & Hoare

[57] ABSTRACT

A wear-resistant annular insert which may be used as a wire drawing die, includes an annular exterior layer and an annular interior layer, containing diamond or cubic boron nitride crystals, bonded to the interior of the annular exterior layer by a β-silicon carbide and silicon matrix. The insert is formed by preparing a first dispersion of carbon fiber, carbon black and filler in a temporary binder such as paraffin, and preparing a second mixture of the crystal material and carbon black in the temporary binder. The first and second mixtures are compressed in a mold such that the first and second mixtures form the exterior and interior layers, respectively. The layers are then heated to allow for the removal of the temporary binder and the infiltration of liquefied silicon. The layers are then sintered to produce the annular insert.

7 Claims, 15 Drawing Figures

WEAR RESISTANT ANNULAR INSERT AND PROCESS FOR MAKING SAME

BACKGROUND OF THE INVENTION

The present invention is directed to the field of annular ring shaped inserts which require a high degree of wear-resistance. Such annular inserts are typically employed as wire drawing dies in the field of wire drawing or extruding.

The annular inserts described above at one time predominantly consisted of tungsten carbide components. However, a diamond or cubic boron nitride components exhibit a higher wear-resistance than the tungsten carbide components. Thus, a great deal of attention in the field of wire drawing has been given to the development of diamond wire drawing dies.

Sumitomo Electric in Japan has succeeded in producing high quality diamond composite wire drawing dies, the life of which has been significantly extended over that of the prior dies. See Proceedings, pages 195–201, Oct. 13–15, 1980, by Ind. Diamond Assoc. "Newly Developed Fine-Grained Sintered Diamond" by S. Yazu and A. Hara (Sumitomo Electric Co.), Fourth international Seminar, Chicago, Ill.

Although the above described diamond wire drawing die provides a high degree of wear-resistance, production of such dies is relatively slow and expensive.

On the other hand, a straightforward technique (hereinafter referred to as the "press and treat" technique) for forming high quality cutting inserts, which technique readily lends itself to mass production, is disclosed in U.S. patent applications Ser. Nos. 167,019 and 167,196, both filed July 9, 1980, both abandoned in favor of co-pending continuation application Ser. Nos. 313,241, now U.S. Pat. No. 4,428,755, and 312,987, now U.S. Pat. No. 4,417,906, respectively, both by Dr. John M. Ohno, and assigned to the assignee of the present invention, the entire disclosures of which are hereby incorporated by reference. Very briefly, the press and treat technique involves the preparation of a first or crystal dispersion of super-hard crystals such as diamond or cubic boron nitride crystals in carbon black and a second dispersion of carbon black, carbon fiber and filler material (such as superfine silicon carbide). The two dispersions are individually mixed with a small amount of binder such as paraffin to lend a sufficient green strength to the two dispersions upon cold compaction thereof. After compacting the two dispersions together in a desired configuration, the compact is vacuum heated in the presence of silicon to burn off the paraffin and to allow the silicon to infiltrate both dispersions. Upon further heating, and without the need for the constant application of any type of pressure to the insert, the silicon reacts with the carbon black to form a $\beta$-silicon carbide and silicon matrix which bonds both dispersions both internally and to each other.

The use of the press and treat technique has heretofore been disclosed primarily for the formation of cutting inserts, such as those disclosed in co-pending U.S. patent application Ser. Nos. 226,604 filed Jan. 21, 1981, now abandoned; 286,613 filed July 24, 1981, now abandoned, both by Dr. John M. Ohno and assigned to the assignee of the present invention; and the above-mentioned Ser. Nos. 167,196 and 167,019.

SUMMARY OF THE INVENTION

It is therefore an object of the present invention to employ the above-mentioned press and treat technique in the field of wear-resistant annular inserts, and particularly to a wire drawing or extruding die.

It is a further object of the present invention to provide processes for producing a wear-resistant annular insert in accordance with the press and treat technique.

It is a further object of the present invention to provide a wear-resistant annular insert which may be economically and rapidly manufactured yet which provides a high degree of wear-resistance.

In accordance with the first aspect of the present invention, a process for producing a wear-resistant annular insert includes the preparation of a first mixture of super-hard crystals, such as diamond or cubic boron nitride crystals, and carbon black in a temporary binder, and a second mixture of carbon fiber, carbon black and filler in a temporary binder. The first and second mixtures are compressed in a mold such that the second mixture forms an annular exterior layer and the first mixture forms an annular interior layer within and adjacent to the exterior layer. The annular interior and exterior layers are then heated to allow for the removal of the temporary binder and the infiltration of liquefied silicon into the annular interior and exterior layers. The annular interior and exterior layers are then sintered to produce the wear-resistant annular insert.

The annular interior and exterior layers may be subjected to hydraulic isostatic pressure prior to the step of heating the annular interior and exterior layers.

In accordance with a first embodiment of this aspect of the invention, the second mixture is deposited in the mold and compressed to form the annular exterior layer, and the first mixture is then deposited within the annular exterior layer and compressed to form the annular interior layer adjacent to the annular exterior layer.

In accordance with a second embodiment of the first aspect of the present invention, the first mixture is deposited in the mold and compressed to form the annular interior layer, and the second mixture is deposited around the annular interior layer and compressed thereabout to form the annular exterior layer adjacent to the annular interior layer.

In accordance with a second aspect of the present invention, a wear-resistant annular insert includes a generally cylindrical composite having an annular exterior layer and an annular interior layer. The annular interior layer is bonded to the interior of the annular exterior layer by a $\beta$-silicon carbide and silicon matrix. The annular interior layer contains a dispersion of diamond or cubic boron nitride crystals and has an input diameter at one portion thereof and the output diameter smaller than the input diameter at another portion thereof, such that a material drawn through the insert will attain a diameter substantially equal to the output diameter.

BRIEF DESCRIPTION OF THE DRAWINGS

These and other objects, aspects and embodiments of the present invention will be more fully described with reference to the following drawing figures of which.

DETAILED DESCRIPTION OF THE INVENTION

Figure 1:
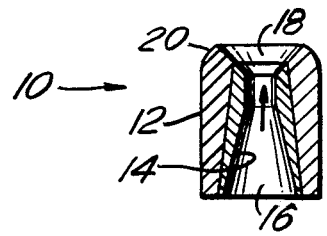
FIG. 1 is a cross-section illustration of a wear-resistant annular insert produced in accordance with a first embodiment of the present invention.

The first embodiment of the present invention will now be described with reference to FIGS. 1-8. With specific reference to FIGS. 1 and 2, the wear-resistant annular insert 10 in accordance with the first embodiment of the invention is comprised of an annular, bi-layer construction including exterior layer 12 and interior layer 14 configured so as to provide a wide entry port 16 and a more narrow exit port 18. Exterior layer 12 is configured to provide an overall cylindrical shape to the insert, the upper portion of the exterior layer providing shoulder 20.

Figure 9:
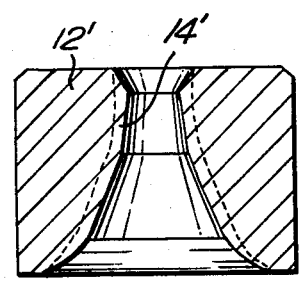
FIG. 9 is a cross-section illustration of a wear-resistant annular insert produced in accordance with a second embodiment of the present invention.

The interior and exterior layers 14 and 12, respectively, correspond to the first and second dispersions produced according to the press and treat technique described in the above-mentioned pending patent applications. Specifically, the interior layer is formed from a first dispersion of super-hard crystals, such as diamond or cubic boron nitride crystals, in carbon black, and the exterior layer is formed from a second dispersion of carbon black, carbon fiber and filler material. The first and second dispersions are individually mixed with a small amount of paraffin to lend a sufficient green strength to the two layers upon cold compaction thereof. After compacting the layers 12 and 14 together in the configuration as illustrated in FIG. 1 (or as shown in FIG. 9, discussed below), the compact is vacuum heated in the presence of silicon to burn off the paraffin and to allow the silicon to infiltrate both dispersions. Upon further heating, and without the need for the constant application of any type of pressure to the insert, the silicon reacts with the carbon black to form a $\beta$-silicon carbide and silicon matrix which bonds layers both internally and to each other.

The insert illustrated in FIG. 1 is so configured as to reduce the volume of the interior layer to a minimum in order to accordingly reduce the amount of diamond or cubic boron nitride material which must be employed in the insert. By doing so, the cost of the insert is substantially reduced, while at the same time obtaining the benefits accorded through the use of such crystal material.

Figure 2:
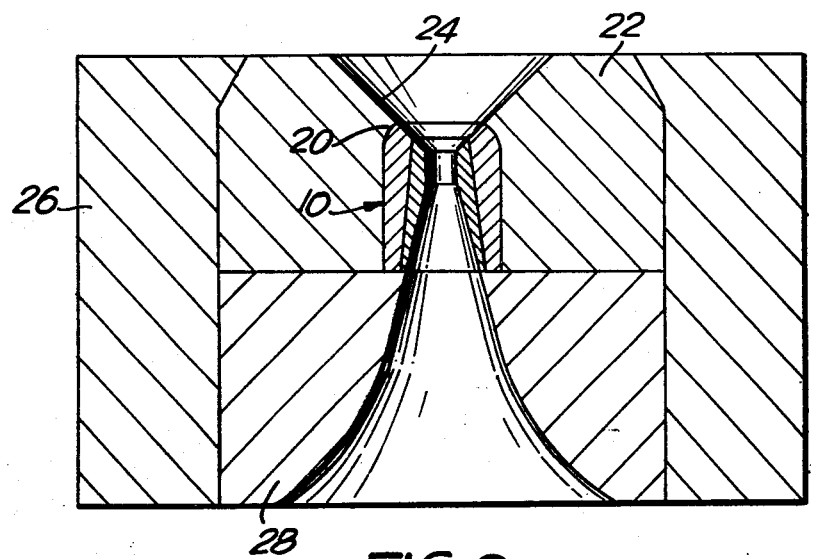
FIG. 2 is a cross-section illustration of the annular insert produced in accordance with the present invention disposed within an assembly for holding the insert.

FIG. 2 illustrates a reliable technique for mounting the insert 10. Insert 10 is disposed within tungsten carbide ring 22, shoulder 20 abutting tungsten carbide ring 22 at annular seat 24. The insert 10 and tungsten carbide ring 22 are maintained within annular holder 26 by ring mount 28. Mounting the insert in such a manner reduces vibration during operation of the device in order to obtain a high quality product. The insert 10, FIG. 9 (discussed in detail below) may be mounted in a similar manner.

Figure 3:
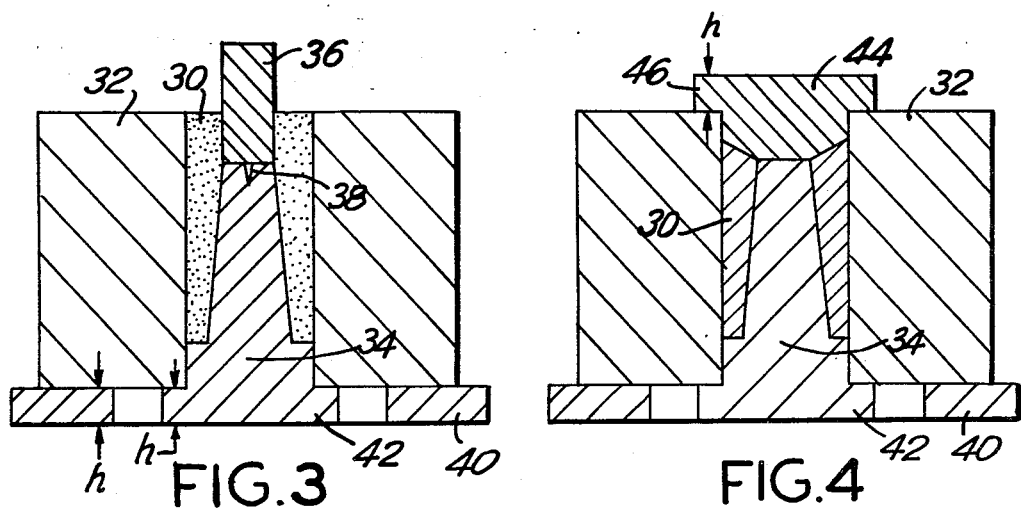
FIGS. 3-8 are cross-section illustrations of the first through sixth steps, respectively, of the process for producing the insert illustrated in FIG. 1.
Figure 4:
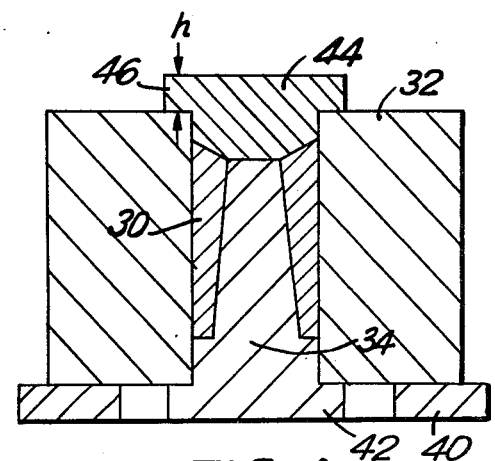

The process for producing the insert illustrated in FIG. 1 will now be described with reference to FIGS. 3-8. In FIG. 3, the mixture 30 of carbon black, carbon fiber, filler material and paraffin (the "second" dispersion described above), which mixture will eventually become exterior layer 12, is loaded into the void provided between annular mold 32 and cores 34 and 36, the alignment of cores 34 and 36 being provided by pin 38. The mold 32 and associated apparatus may be mounted on an annular base block 40 having height h, core 34 having a base portion 42 of a corresponding height.

After so loading the mixture 30 as shown in FIG. 3, core 36 is removed and a plunger 44 is pressed onto the top of core 34 in order to softly compress mixture 30 into an intermediate compact. Plunger 44 is also provided with a base 46 having the same height h.

Figure 5:
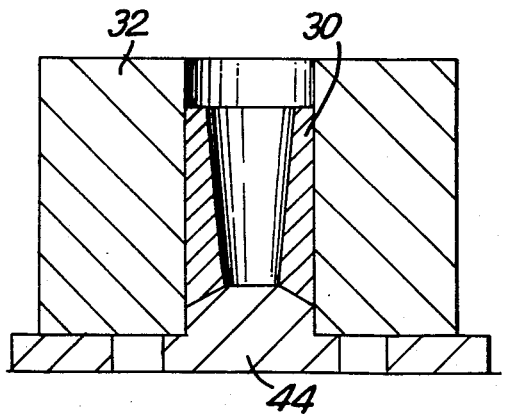
Figure 6:
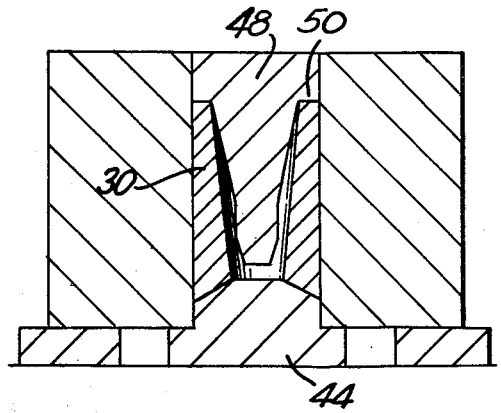

The mold is then inverted to place plunger 44 on the bottom, and core 34 may be removed as shown in FIG. 5. Core 48 may then be placed inside the mold, core 48 being provided with an annular seat 50 which abuts the softly compressed mixture 30, as shown in FIG. 6.

Figure 7:
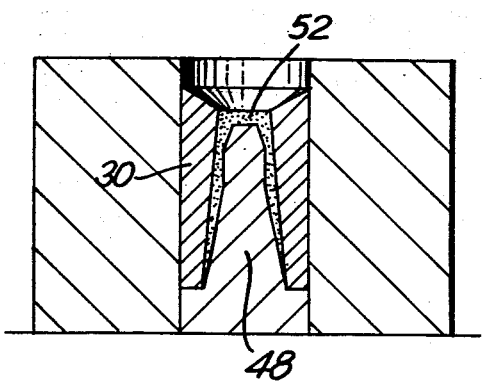

The mold is again inverted and mixture 52, of superhard crystals and carbon black in paraffin (the "first" dispersion described above), which will eventually form interior layer 14, is loaded into the void provided between core 48 and mixture 30, as shown in FIG. 7.

Figure 8:
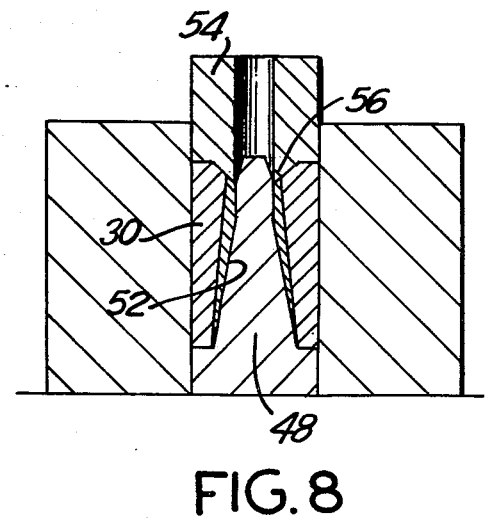

Finally, as illustrated in FIG. 8 annular plunger 54, having a forward-jutting rim 54 along the interior circumference thereof, is forced down over core 48 to thereby tightly compact mixtures 30 and 52 to form a physically stable composite compact.

The composite compact is then removed from the mold and the shoulder 20, FIG. 1, is soft-formed prior to sintering. The compact is then vacuum heated in the presence of silicon to burn off the paraffin and to allow the silicon to infiltrate both mixtures, as more fully explained in co-pending U.S. patent applications Ser. Nos. 167,019 and 167,196. Upon further heating, and without need for the constant application of any type of pressure to the insert, the silicon reacts with the carbon black to form a $\beta$-silicon carbide and silicon matrix which bonds both mixtures both internally and to each other to form the interior and exterior layers 14 and 12, respectively, as shown in FIG. 1.

FIG. 9 illustrates a second embodiment of the present invention which provides an insert 10, having a slightly more contoured internal surface than insert 10, FIG. 1.

The process for producing the insert illustrated in FIG. 9 will now be described with further reference to FIGS. 10-15. Essentially, the main difference between the process illustrated in FIGS. 10-15 and that illustrated in FIGS. 3-8 is the order in which the interior and exterior layers are formed. For the process illustrated in FIGS. 3-8, the exterior layer 12 is first formed as an intermediate compact, layer 14 further compacted onto layer 12, while in the process illustrated in FIGS. 10-15, the interior layer 14' is formed first, exterior layer 12' being compressed onto layer 14'.

Figure 10:
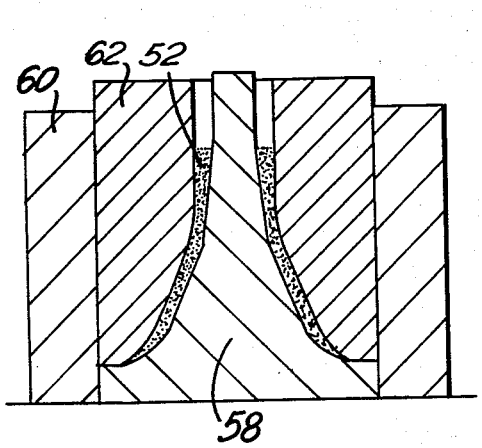
FIGS. 10-15 are cross-section illustrations of the first through sixth steps, respectively, of the process for producing the insert illustrated in FIG. 9.
Figure 11:
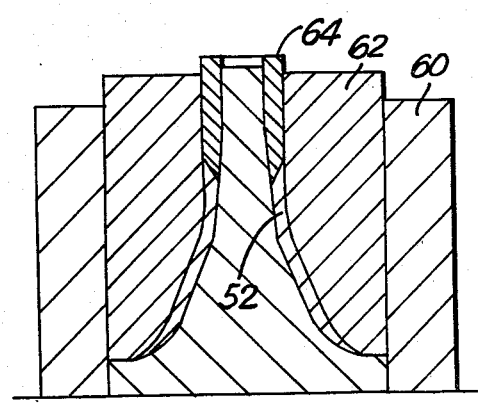

With reference to FIG. 10, carbide core 58 is placed within annular carbide mold 60. An annular steel plunger 62 is placed on top of carbide core 58 in abutting relation thereto. The mixture 52 of diamond or cubic boron nitride crystals in carbon black in paraffin is loaded into the void provided between carbide core 58 and steel plunger 62 as shown. Annular plunger 64 is then placed over the upper end of carbide core 58 to compress mixture 52 fo form an intermediate composite as shown in FIG. 11.

Figure 12:
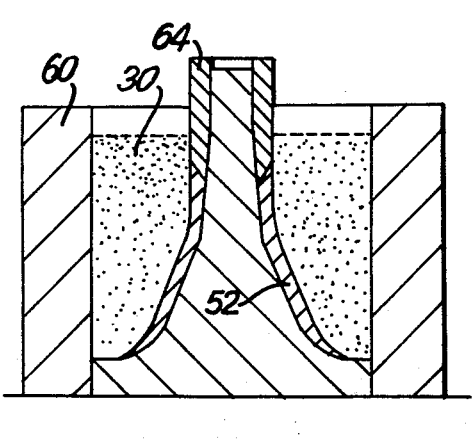
Figure 13:
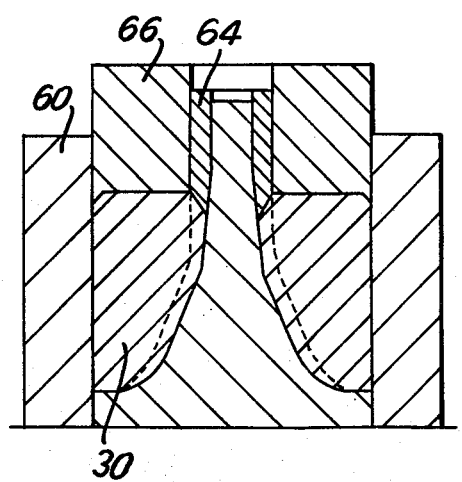

Steel plunger 62 is then removed while maintaining plunger 64 in position as illustrated in FIG. 12, and mixture 30 is loaded into the void provided between carbide mold 60 and mixture 52. With plunger 64 still in place, annular plunger 66 is placed over plunger 64 to compress mixture 30, and to further compress mixture 52, to the required pressure, as illustrated in FIG. 13.

Figure 14:
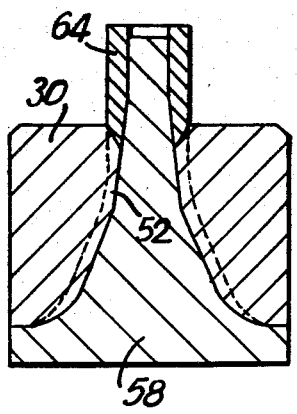
Figure 15:
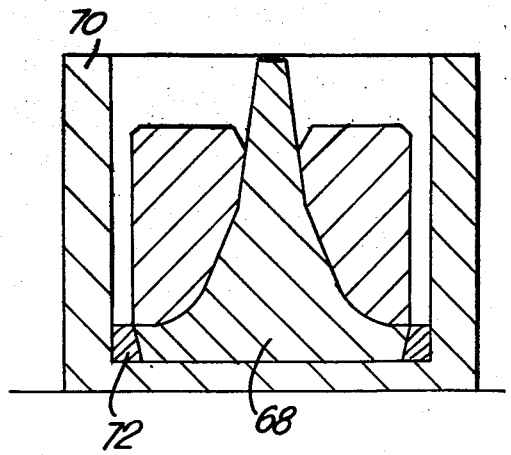

The compressed composite of mixtures 30 and 52 is removed from mold 60 along with carbide core 58 and plunger 64 as illustrated in FIG. 14, and conventionally subjected to an isostatic pressing in an elastic envlope (not shown). The isostatic pressing may also be provided in the production of the FIG. 1 embodiment as well, if desired. The compressed composite is then removed from carbide core 58 and placed on core 68 made from hexagonal boron nitride, as illustrated in FIG. 15. The composite and core 68 may then be placed within container 70, and centrally disposed therein by means of annular seat 72 for the vacuum heating, silicon infiltration, and sintering steps as disclosed in the above-mentioned co-pending application Ser. Nos. 167,019 and 167,196. If container 70 is made of graphite, the inside thereof should be coated with hexagonal boron nitride paint.

Thus, the wear-resistant annular inserts illustrated in FIGS. 1 or 9 may be produced using the inexpensive press and treat technique described in the above-mentioned co-pending applications. The inserts produced in accordance with such technique provide a very high degree of wear-resistance, are relatively inexpensive since the crystal material is localized only in critical areas and may be produced in large volumes using mass production techniques.

While the preferred embodiments and examples of the present invention have been described with reference to the foregoing specification and drawings, the scope of the invention shall now be defined with reference to the following claims.

I claim:

1. A process for producing a wear-resistant annular insert, comprising:
   preparing a first mixture of super-hard crystals selected from at least one member of the group consisting of diamond and cubic boron nitride crystals, and carbon black in a temporary binder;
   preparing a second mixture of carbon fiber, carbon black and filler in a temporary binder;
   depositing said second mixture in a mold and compressing said second mixture in said mold to form an annular exterior layer;
   depositing said first mixture within said annular exterior layer and compressing said first mixture therein to form an annular interior layer adjacent to said annular exterior layer;
   heating said annular interior and exterior layers to allow for the removal of said temporary binder and the infiltration of liquefied silicon into said annular interior and exterior layers; and
   sintering said annular interior and exterior layers to produce said wear-resistant annular insert.

2. A process for producing a wear-resistant annular insert, comprising:
   preparing a first mixture of super-hard crystals selected from at least one member of the group consisting of diamond and cubic boron nitride crystals, and carbon black in a temporary binder;
   preparing a second mixture of carbon fiber, carbon black and filler in a temporary binder;
   depositing said first mixture in a mold and compressing said first mixture in said mold to form an annular interior layer;
   depositing said second mixture around said annular interior layer and compressing said second mixture thereabout to form an annular exterior layer adjacent to said annular interior layer;
   heating said annular interior and exterior layers to allow for the removal of said temporary binder and the infiltration of liquefied silicon into said annular interior and exterior layers; and
   sintering said annular interior and exterior layers to produce said wear-resistant annular insert.

3. A process for producing a wear-resistant annular insert, comprising:
   preparing a first mixture of super-hard crystals selected from at least one member of the group consisting of diamond and boron nitride crystals, and carbon black in a temporary binder;
   preparing a second mixture of carbin fiber, carbon black and filler in a temporary binder;
   compressing said first and second mixtures in a mold such that said second mixture forms an annular exterior layer and said first mixture forms an annular interior layer within and adjacent to said exterior layer;
   heating said annular interior and exterior layers to allow for the removal of said temporary binder and the infiltration of liquefied silicon into said annular interior and exterior layers; and
   sintering said annular interior and exterior layers to produce said wear-resistant annular insert.

4. The process of any one of claims 1 through 3 further comprising subjecting said annular interior and exterior layers to isostatic pressure prior to the step of heating said annular interior and exterior layers.

5. The product produced in accordance with the process recited in any one of claims 1 through 3.

6. The product produced in accordance with the process recited in claim 4.

7. A wear-resistant annular insert comprising a generally cylindrical composite including an annular exterior layer and an annular interior layer bonded to the interior of said annular exterior layer by a beta-silicon carbide and silicon matrix, said exterior layer containing beta-silicon carbide and silicon, said annular interior layer containing super-hard crystals selected from at least one member of the group consisting of diamond and cubic boron nitride crystals, beta-silicon carbide and silicon, said annular interior layer having an input diameter at one portion thereof and an output diameter smaller than said input diameter at another portion thereof such that a material drawn through said wear-resistant insert will attain a diameter substantially equal to said output diameter.

* * * * *